United States Patent
Wang

(10) Patent No.: US 11,052,931 B2
(45) Date of Patent: Jul. 6, 2021

(54) TROLLEY CASE HANDLE AND TROLLEY CASE

(71) Applicant: SHANGHAI NEWEST LUGGAGE CO LTD, Shanghai (CN)

(72) Inventor: Xiangjun Wang, Shanghai (CN)

(73) Assignee: SHANGHAI NEWEST LUGGAGE CO LTD, Shanghai (CN)

( * ) Notice: Subject to any disclaimer, the term of this patent is extended or adjusted under 35 U.S.C. 154(b) by 210 days.

(21) Appl. No.: 16/447,875

(22) Filed: Jun. 20, 2019

(65) Prior Publication Data
US 2020/0122765 A1    Apr. 23, 2020

(30) Foreign Application Priority Data
Oct. 18, 2018 (CN) .......................... 201821691606.4

(51) Int. Cl.
| B62B 5/06 | (2006.01) |
| B62B 3/00 | (2006.01) |
| A45C 13/28 | (2006.01) |

(52) U.S. Cl.
CPC .............. *B62B 5/064* (2013.01); *A45C 13/28* (2013.01); *B62B 3/001* (2013.01)

(58) Field of Classification Search
CPC ......... A45C 13/26; A45C 13/28; B62B 5/065; B62B 9/26
USPC ..................................................... 280/655.1
See application file for complete search history.

(56) References Cited

U.S. PATENT DOCUMENTS

| 4,881,706 A | * | 11/1989 | Sedlik | ................. B65B 67/1227 248/99 |
| 5,005,791 A | * | 4/1991 | Lanzen | ............... B65B 67/1211 248/99 |
| 6,986,492 B2 | * | 1/2006 | Huang | .................. G06F 1/1632 248/346.03 |
| 7,219,822 B2 | * | 5/2007 | Chretien | ............... B62B 3/1428 224/331 |
| 7,391,606 B2 | * | 6/2008 | Chen | .................... F16M 11/126 248/917 |
| 7,448,587 B2 | * | 11/2008 | Han | ........................ A47B 91/00 211/41.6 |
| 7,510,157 B2 | * | 3/2009 | Oliver | .................... A45C 13/28 220/739 |
| 7,712,719 B2 | * | 5/2010 | Derry | ..................... F16M 11/38 248/346.06 |
| 8,096,517 B1 | * | 1/2012 | Hamilton | ............... B60N 3/005 248/308 |
| 8,672,199 B1 | * | 3/2014 | Ditore | .................. B62B 3/1424 224/411 |
| D712,660 S | * | 9/2014 | Ke | ................................ D3/318 |

(Continued)

*Primary Examiner* — Jeffrey J Restifo
(74) *Attorney, Agent, or Firm* — JCIP Global Inc.

(57) ABSTRACT

A trolley case handle and a trolley case are disclosed. The trolley case handle includes a handle body and at least one bracket. The handle body has at least one groove for accommodating the at least one bracket. Each of the at least one bracket is connected to the handle body through a connecting shaft. The connecting shaft functions as a rotation shaft about which the bracket is capable of rotating relative to the handle body. Each of the at least one bracket is provided with a U-shaped notch. In addition, a handle top cover is disposed on a top portion of the handle body. When the handle top cover is in an open state, the connecting shaft is accessible and can be detached from the handle body.

18 Claims, 3 Drawing Sheets

(56) References Cited

U.S. PATENT DOCUMENTS

| | | | | |
|---|---|---|---|---|
| D714,063 S * | 9/2014 | Ke | ................................ | D3/318 |
| 8,973,928 B2 * | 3/2015 | Mellinger | ................. | B62B 9/26 |
| | | | | 280/47.35 |
| 9,433,287 B2 * | 9/2016 | Chen | ...................... | A47B 81/06 |
| 9,628,913 B2 * | 4/2017 | Miller | ...................... | H04R 5/00 |
| 9,700,164 B2 * | 7/2017 | Klugh | ................. | A45C 13/262 |
| 9,864,414 B2 * | 1/2018 | Oakley | ................. | G06F 1/1626 |
| D865,753 S * | 11/2019 | Date | ........................... | D14/253 |
| 10,582,789 B2 * | 3/2020 | Klugh | ................. | A47G 23/0225 |
| 10,674,815 B1 * | 6/2020 | Geller | ................. | H05K 5/0234 |
| 2008/0196988 A1 * | 8/2008 | Tong | ........................ | A45C 5/14 |
| | | | | 190/102 |
| 2010/0187062 A1 * | 7/2010 | Sweeney | ................. | A45C 5/14 |
| | | | | 190/1 |
| 2012/0161406 A1 * | 6/2012 | Mersky | ................. | F16M 13/02 |
| | | | | 280/33.992 |
| 2013/0001927 A1 * | 1/2013 | Mellinger | ................. | B62B 9/26 |
| | | | | 280/647 |

* cited by examiner

TROLLEY CASE HANDLE AND TROLLEY CASE

CROSS-REFERENCE TO RELATED APPLICATION

This application claims the priority benefits of Chinese application serial no. 201821691606.4, filed on Oct. 18, 2018. The entirety of the above-mentioned patent application is hereby incorporated by reference herein and made a part of specification.

BACKGROUND

Technical Field

The present disclosure relates to the field of trolley case technologies, and in particular, to a trolley case handle and a trolley case.

Description of Related Art

With diversification of functions of portable electronic devices, the portable electronic devices have become one of the most commonly used and longest-used tools for modern people.

A trolley case is a luggage case having a pull rod and trolley wheels. As is convenient to use and greatly reduces a carrying burden because of its large accommodation space, the trolley case has been commonly used by modern people during voyage, going out, and going to school. A handle disposed on the trolley case is usually used only for dragging a case body, and the function is simple. Therefore, how to improve portability of a portable electronic device by using a trolley case, increase functions of a trolley case handle, and improve practicability of the trolley case for a user has become a problem to be considered.

SUMMARY

For solving the foregoing problem, an objective of the present disclosure is to provide a trolley case handle and a trolley case, so that the trolley case has functions of accommodating a portable electronic product such as a mobile phone or a tablet computer and hanging objects such as clothes during a waiting time of voyage or going outing.

Based on the foregoing objective, the present disclosure provides a trolley case handle including a handle body and at least one bracket. The handle body has at least one groove formed therein to accommodate the at least one bracket. Each of the at least one bracket is connected to the handle body by using a connecting shaft. The connecting shaft functions as a rotation shaft about which the at least one bracket is capable of rotating relative to the handle body. Each of the at least one bracket is provided with a U-shaped notch.

Optionally, two brackets are included. The handle body has two grooves formed therein and the two grooves are configured to respectively accommodate the two brackets.

Optionally, the two grooves extend along a transverse axis of the handle body, and the two brackets are symmetrically disposed with respect to a longitudinal axis of the handle body that is perpendicular to the transverse axis.

Optionally, the connecting shaft has one end fastened to one side face of the groove, and the bracket has one end fastened to the groove by using the connecting shaft.

Optionally, the groove is formed in a front surface of the handle body. The handle body has a top portion that is provided with a handle top cover that is able to switch between a close state and an open state. When the handle top cover is in the close state, the handle top cover covers the top portion of the handle body so that the connecting shaft is not accessible. When the handle top cover is in the open state, the connecting shaft is accessible and can be detached from the handle body.

Optionally, the connecting shaft is of a hollow shape. An outer diameter of the connecting shaft is greater than a diameter of a fastening hole in the bracket. The connecting shaft is in transition fit with the fastening hole.

Optionally, the bracket is able to rotate at an angle of 0 degree to 90 degrees relative to the handle body about the connecting shaft.

Optionally, a surface of the bracket and/or a surface of the connecting shaft has an anti-slip coating layer, and/or an anti-slip apparatus is provided between the bracket and the connecting shaft.

Optionally, the bracket is made of plastic, metal, and/or alloy; and/or the connecting shaft is made of plastic, metal, and/or alloy.

Optionally, the two brackets are embedded into a same side of the handle body.

According to another aspect, the present disclosure further provides a trolley case, including the trolley case handle described above.

Optionally, the trolley case includes a pull rod and a case body. The trolley case handle is a handle of the pull rod and/or a handle of the case body.

It can be seen from the foregoing description that, according to the trolley case handle and the trolley case provided in the present disclosure, a U-shaped notch is provided on the bracket of the trolley case handle so that the brackets can accommodate an electronic product such as a mobile phone or a tablet computer. When a single bracket is used, it can hang objects such as clothes, so that functions of the trolley case handle are increased and practicability of the trolley case is improved.

To make the aforementioned more comprehensible, several embodiments accompanied with drawings are described in detail as follows.

BRIEF DESCRIPTION OF THE DRAWINGS

To more clearly describe embodiments of the present disclosure or technical solutions in the prior art, the following briefly describes accompanying drawings required for describing the embodiments or the prior art. Apparently, the accompanying drawings in the following description show merely some embodiments of the present disclosure, and shall not be limited thereto.

DESCRIPTION OF THE EMBODIMENTS

To make the objectives, the technical solutions, and the advantages of the present disclosure clearer and more understandable, the present disclosure is further described in more details in combination with specific embodiments and with reference to the accompanying drawings.

It should be noted that, in the embodiments of the present disclosure, all expressions using "first" and "second" are used to distinguish between two different entities having a same name or two different parameters having a same name. As can be learned, "first" and "second" are used merely for convenience of description, and should not be construed as limitations on the embodiments of the present disclosure. This is not described any more in subsequent embodiments.

Figure 1:
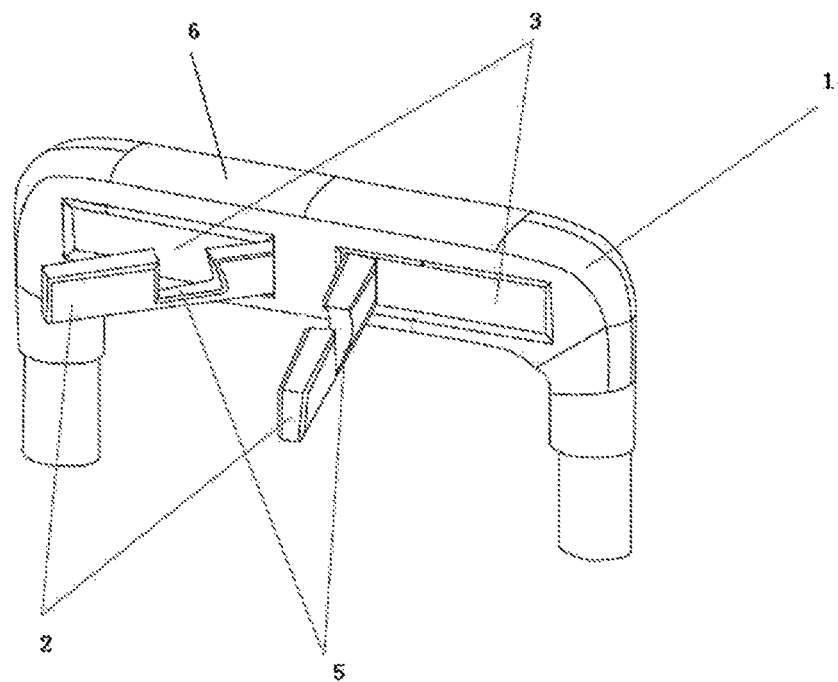
FIG. 1 is a schematic structural diagram of a trolley case handle according to an embodiment of the present disclosure.

As shown in FIG. 1, the trolley case handle includes a handle body 1 and at least one bracket 2. The handle body 1 is provided with at least one groove 3 configured to accommodate the bracket 2. The bracket 2 is connected to the handle body 1 by using a connecting shaft 4, and is capable of rotating relative to the handle body 1 by using the connecting shaft 4 as a rotation shaft. The bracket 2 is provided with a U-shaped notch 5.

According to the trolley case handle provided in this embodiment, the U-shaped notch 5 is provided on the bracket 2 of the trolley case handle for accommodating an electronic product such as a mobile phone or a tablet computer. A single bracket can be used to hang objects such as clothes, so that functions of the trolley case handle are increased, and practicability of the trolley case is improved.

Figure 5:
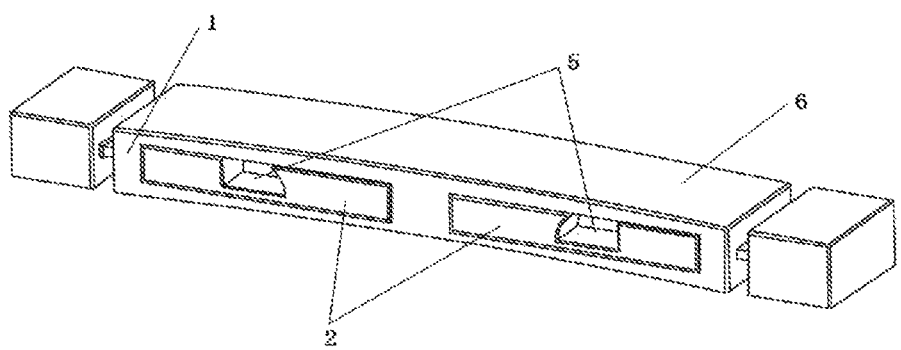
FIG. 5 is a schematic structural diagram of a handle of a case body of a trolley case when a bracket is closed according to an embodiment of the present disclosure.

It should be noted that, FIG. 1 is a description using a handle of a pull rod of the trolley case as an example. However, it can be seen that, in addition to the handle of the pull rod, the trolley case is further provided with a handle of a case body (as shown in FIG. 5). In addition, usually, the handle of the case body further includes two types of handles, namely, a handle provided on a top portion of the case body and a handle provided on a side face of the case body. Each of these handles can be designed by using an implementation of the trolley case handle described above. This should not be specifically limited herein.

Figure 2:
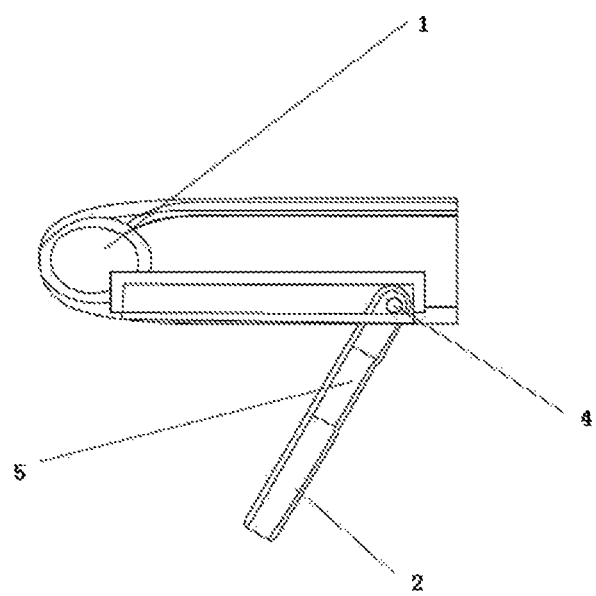
FIG. 2 is a partial sectional view of the trolley case handle according to the embodiment of the present disclosure from an angle of top view.

Preferably, as shown in FIG. 1 and FIG. 2, the trolley case handle has two grooves 3 formed therein. The grooves extend along a transverse axis of the handle body 1. The trolley case handle further has two pieces of brackets 2 that can rotate with the connecting shafts 4 relative to the handle body 1. The two brackets 2 are symmetrically disposed on a same side, e.g. on a front surface of the trolley case handle body with respect to a longitudinal axis of the handle body 1. A top portion of the handle is provided with a handle top cover 6. During normal cases in which the brackets are not used, the brackets 2 are hidden in the two grooves 3 provided in the handle body 1, and an appearance is the same as a common trolley case handle. That is, when the brackets 2 are received in the grooves 3, their surfaces are flush with a front surface of the handle body 1. When the brackets 2 need to be used, the two pieces of brackets 2 can be enabled to rotate with respect to the handle body 1 to appropriate positions. The brackets can accommodate electronic devices of different sizes when positions at which the brackets are vary, so that the trolley case handle is applicable of accommodating various electronic devices of different sizes.

Figure 3:
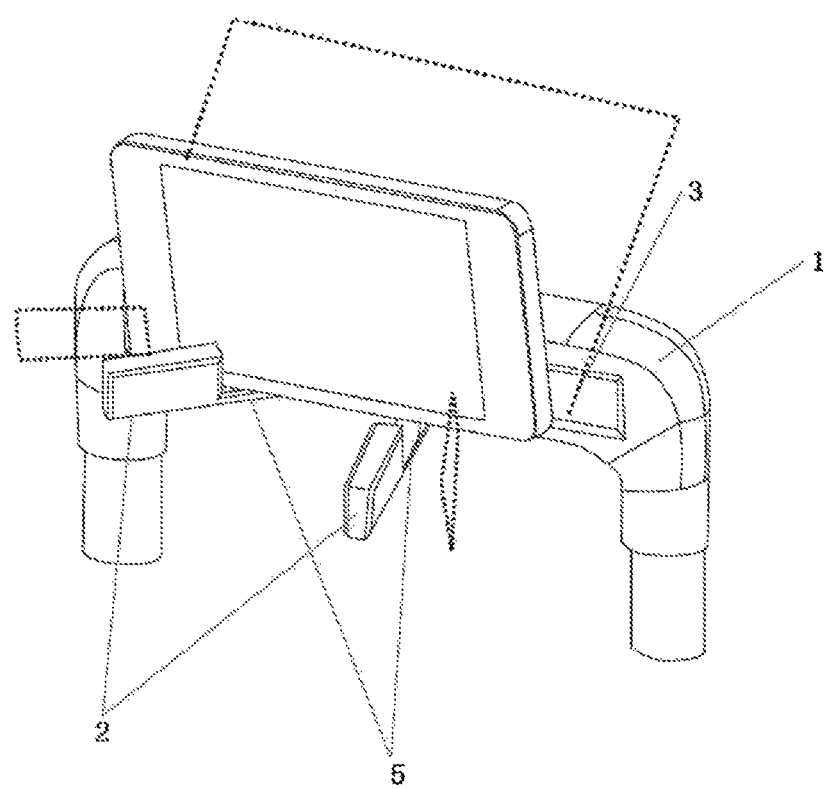
FIG. 3 is a schematic diagram of a state of the trolley case handle accommodating a mobile phone according to the embodiment of the present disclosure.

By arranging two brackets 2, a planar object such as a mobile phone may be accommodated more stably. In this embodiment, each connecting shaft 4 is located at an end of a corresponding groove close to the other groove. The connecting shaft 4 is of a hollow shape, and an outer diameter of the connecting shaft is slightly greater than a diameter of a fastening hole in the bracket 2. The connecting shaft 4 is in transition fit with the fastening hole during mounting, so that the connecting shaft generates a circumferentially outward elasticity under compressing of the fastening hole. The outward elasticity acts on the fastening hole, so that when the bracket 2 rotates, a particular damping force is generated, and the bracket can be fixed at any angle in a range of 0 degree to 90 degrees, as shown in FIG. 3. Optionally, an anti-slip coating layer is applied on a surface of the bracket and a surface of the connecting shaft, so that when rotating to a particular angle, the bracket is fixed in that position and stops moving, thereby increasing a stability of the bracket in use. In other embodiments, an anti-slip apparatus may be provided between the bracket and the connecting shaft. Because the bracket is provided with a U-shaped notch 5, an angle of the electronic device with respect to the handle body 1 can be fixed when the electronic device is accommodated in the notch 5. As shown in FIG. 3, an angle of the electronic device relative to a horizontal plane or a vertical plane is decided by size of the notch 5 and/or the angle of side walls of the notch 5 in the bracket 2. The U-shaped notch 5 on the bracket 2 is suitable for accommodating various electronic devices such as mobile phones or tablet computers, and if no electronic device is accommodated, a hook function may be provided for hanging clothes, thereby facilitating use during voyage and in various aspects.

Optionally, the bracket 2 is made of plastic, metal, and/or alloy; and the connecting shaft 4 is made of plastic, metal, and/or alloy.

According to the trolley case handle provided in this embodiment, the U-shaped notch 5 is provided on the bracket 2 of the trolley case handle so as to accommodate an electronic device, and functions of the trolley case handle are increased, so that it is convenient for a user to use an electronic device during leisure time of voyage, thereby increasing convenience of use of the electronic device, and improving a practical value of the trolley case.

Figure 4:
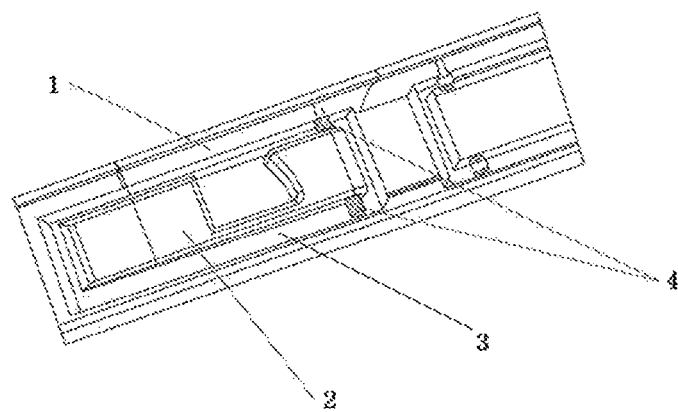
FIG. 4 is a partial sectional view of a trolley case handle according to an embodiment of the present disclosure from an angle of side view.

In another embodiment, as shown in FIG. 4, one end of the connecting shaft 4 is fastened to a side face of the groove 3, and one end of the bracket 2 is fastened to the groove 3 by using the connecting shaft 4. An opening of the groove is provided on a front surface of the handle body 1. A top portion of the handle is provided with a handle top cover 6 that is able to switch between a close state and an open state. When the handle top cover 6 is in the close state, the handle top cover 6 covers the top portion of the handle body 1 so that the connecting shaft 4 is not accessible. When the handle top cover 6 is in an open state, the connecting shaft 4 can be detached from the handle body 1 and removed. In addition, the bracket 2 can also be removed from the groove 3 and replaced.

In this embodiment, by providing the handle top cover 6 on the top portion of the handle body 1, when the handle top cover 6 is opened, the connecting shaft 4 can be detached from the handle body 1 and replaced, so that the trolley case handle can be repeatedly used for a plurality of times, thereby improving efficiency in using the trolley case.

According to another aspect of the present disclosure, a trolley case is further provided. The trolley case includes any embodiment or permutation and combination of the embodiments of the trolley case handle described in the foregoing.

According to the trolley case provided in this embodiment, the U-shaped notch is provided on the bracket of the trolley case handle so as to accommodate an electronic product such as a mobile phone or a tablet computer. A single bracket can be used to hang objects such as clothes, so that functions of the trolley case handle are increased, and practicability of the trolley case is improved.

It should be noted that, FIG. 1 is a description of using a handle of the pull rod of the trolley case as an example. However, it can be learned that, in addition to the handle of the pull rod, the trolley case is further provided with a handle of the case body. In addition, usually, the handle of the case body further includes two types of handles, namely, a handle provided on the top portion of the case body and a handle provided on the side face of the case body. These handles can be designed by using an implementation of the trolley case handle. This should not be specifically limited herein.

Therefore, in the implementation of the present disclosure, the trolley case includes the pull rod and the case body. The trolley case handle is the handle of the pull rod and/or the handle of the case body, thereby increasing practicability of the trolley case.

A person of ordinary in the art should understand that discussions of any of the embodiments above are merely examples, and are not intended to imply limitation of the scope of the disclosure (including claims) on the examples. Based on the idea of the present disclosure, the foregoing embodiments or technical features in different embodiments may be combined. In addition, there are many other variations of different aspects of the present disclosure described above, and for brevity, the variations are not provided in detail. Therefore, any omission, modification, equivalent replacement, improvement, and the like made without departing from the spirit and the principle of the present disclosure should fall within the protection scope of the present disclosure.

What is claimed is:

1. A trolley case handle, comprising a handle body and at least one bracket, wherein the handle body has at least one groove formed therein to accommodate the at least one bracket; each of the at least one bracket is connected to the handle body by using a connecting shaft; the connecting shaft functions as a rotation shaft about which the at least one bracket is capable of rotating relative to the handle body; and each of the at least one bracket is provided with a U-shaped notch,
wherein the connecting shaft is of a hollow shape, an outer diameter of the connecting shaft being greater than a diameter of a fastening hole in the bracket, the connecting shaft being in transition fit with the fastening hole.

2. The trolley case handle according to claim 1, comprising two brackets, wherein the handle body has two grooves formed therein and the two grooves are configured to respectively accommodate the two brackets.

3. The trolley case handle according to claim 2, wherein the two grooves extend along a transverse axis of the handle body, and the two brackets are symmetrically disposed with respect to a longitudinal axis of the handle body that is perpendicular to the transverse axis.

4. The trolley case handle according to claim 2, wherein the two brackets are embedded into a same side of the handle body.

5. The trolley case handle according to claim 1, wherein the connecting shaft has one end fastened to one side face of the groove, the bracket having one end fastened to the groove through the connecting shaft.

6. The trolley case handle according to claim 5, wherein the groove is formed in a front surface of the handle body, the handle body having a top portion that is provided with a handle top cover that is able to switch between a close state and an open state, when the handle top cover is in the close state, the handle top cover covers the top portion of the handle body so that the connecting shaft is not accessible; and
when the handle top cover is in the open state, the connecting shaft is accessible and can be detached from the handle body.

7. The trolley case handle according to claim 1, wherein the bracket is able to rotate at an angle of 0 degree to 90 degrees relative to the handle body about the connecting shaft.

8. The trolley case handle according to claim 1, wherein at least one of a surface of the bracket and a surface of the connecting shaft has an anti-slip coating layer; and an anti-slip apparatus is provided between the bracket and the connecting shaft.

9. The trolley case handle according to claim 1, wherein the bracket is made of at least one of plastic, metal, and alloy; and the connecting shaft is made of at least one of plastic, metal, and alloy.

10. A trolley case, comprising a trolley case handle that comprises a handle body and at least one bracket, wherein the handle body has at least one groove formed therein to accommodate the at least one bracket; each of the at least one bracket is connected to the handle body by using a connecting shaft; the connecting shaft functions as a rotation shaft about which the at least one bracket is capable of rotating relative to the handle body; and each of the at least one bracket is provided with a U-shaped notch,
wherein the connecting shaft is of a hollow shape, an outer diameter of the connecting shaft being greater than a diameter of a fastening hole in the bracket, the connecting shaft being in transition fit with the fastening hole.

11. The trolley case according to claim 10, wherein the trolley case comprises a pull rod and a case body, the trolley case handle being at least one of a handle of the pull rod and a handle of the case body.

12. The trolley case according to claim 10, wherein the trolley case handle comprises two brackets, wherein the handle body has two grooves formed therein and the two grooves are configured to respectively accommodate the two brackets.

13. The trolley case according to claim 12, wherein the two grooves extend along a transverse axis of the handle body, and the two brackets are symmetrically disposed with respect to a longitudinal axis of the handle body that is perpendicular to the transverse axis.

14. The trolley case according to claim 12, the two brackets are embedded into a same side of the handle body.

15. The trolley case according to claim 10, wherein the connecting shaft has one end fastened to one side face of the groove, the bracket having one end fastened to the groove through the connecting shaft.

16. The trolley case according to claim 15, wherein the groove is formed in a front surface of the handle body, the handle body having a top portion that is provided with a handle top cover that is able to switch between a close state and an open state, when the handle top cover is in the close state, the handle top cover covers the top portion of the handle body so that the connecting shaft is not accessible;

and when the handle top cover is in the open state, the connecting shaft is accessible and can be detached from the handle body.

17. The trolley case according to claim 10, wherein the bracket is able to rotate at an angle of 0 degree to 90 degrees relative to the handle body about the connecting shaft.

18. The trolley case according to claim 10, wherein at least one of a surface of the bracket and a surface of the connecting shaft has an anti-slip coating layer; and an anti-slip apparatus is provided between the bracket and the connecting shaft.

\* \* \* \* \*